(12) United States Patent
Weisser

(10) Patent No.: US 6,567,370 B1
(45) Date of Patent: May 20, 2003

(54) APPARATUS FOR THE RECORDING OR FOR THE REPRODUCTION OF INFORMATION WITH A DRIVE SYSTEM FOR A SCANNING DEVICE

(75) Inventor: Fritz Weisser, Georgen (DE)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/647,865

(22) PCT Filed: Apr. 6, 1999

(86) PCT No.: PCT/EP99/02315

§ 371 (c)(1),
(2), (4) Date: Oct. 6, 2000

(87) PCT Pub. No.: WO99/53485

PCT Pub. Date: Oct. 21, 1999

(30) Foreign Application Priority Data

Apr. 6, 1999 (DE) .......................................... 198 15 990

(51) Int. Cl.[7] .............................................. G11B 21/16
(52) U.S. Cl. ........................ 369/244; 369/215; 369/219; 369/249
(58) Field of Search .............................. 369/244, 30.58, 369/30.73, 30.74, 30.87, 30.88, 30.89, 30.78, 43, 44, 44.11, 215, 219, 249; 360/264.3

(56) References Cited

FOREIGN PATENT DOCUMENTS

GB         2147728 A   * 10/1984
GB         0529589 A2  * 8/1992

* cited by examiner

Primary Examiner—William Korzuch
Assistant Examiner—Mark Blouin
(74) Attorney, Agent, or Firm—Joseph S. Tripoli; Paul P. Kiel

(57) ABSTRACT

The invention relates to an apparatus for the recording or for the reproduction of information with a drive system for a scanning device for reading or writing information in one or more tracks of a recording medium. The object of the invention is to provide a drive system for a scanning device which requires little outlay and satisfies the requirements in respect of high positioning accuracy, short access time and self-locking. According to the invention, this object is achieved by means of a drive system comprising a toothed rack arrangement, a straight-toothed gearwheel and a worm, without a helically toothed worm wheel being necessary. For the purpose of an engagement in the straight-toothed gearwheel, the worm is arranged at an angle with respect to the axis of the gearwheel, which angle corresponds to the lead of the said worm. The field of application of the invention is associated with apparatuses for the recording or for the reproduction of information with a drive system for a scanning device for reading or writing information in one or more tracks of a recording medium, such as, for example, a CD, DVD, an erasable CD or DVD or else a magneto-optical recording medium.

10 Claims, 3 Drawing Sheets

Figure 1:
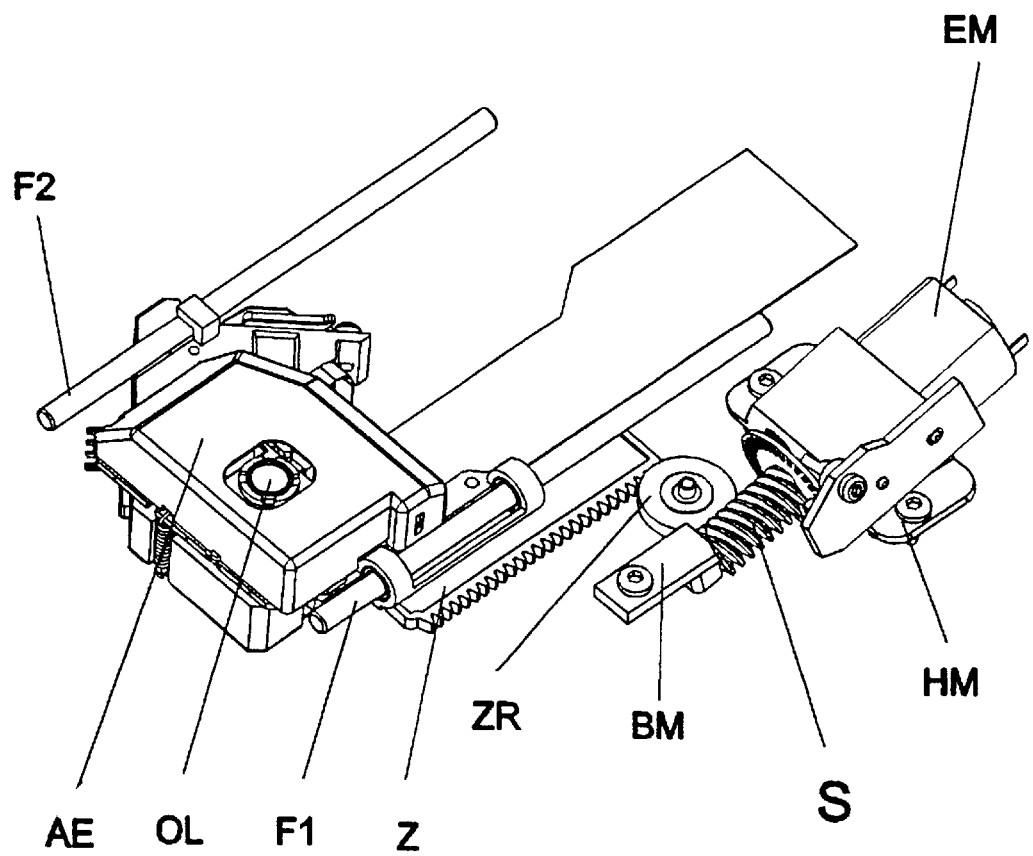

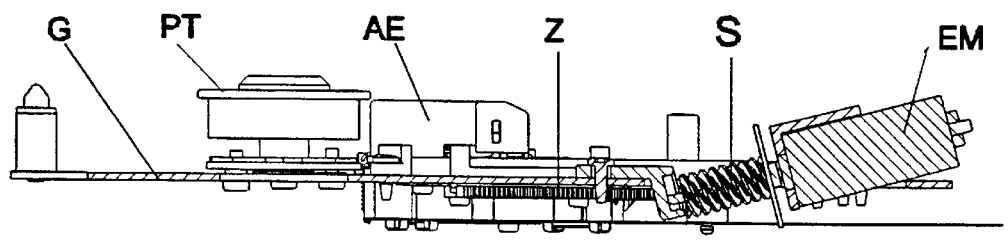
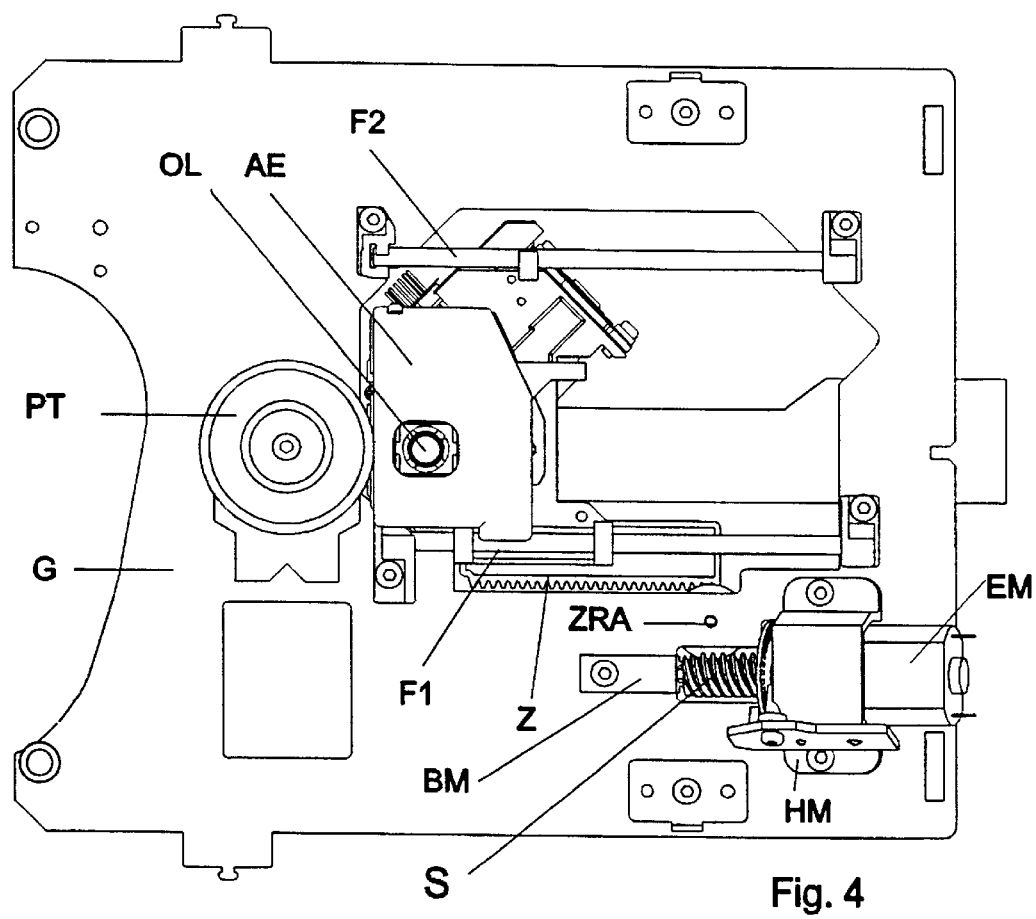

APPARATUS FOR THE RECORDING OR FOR THE REPRODUCTION OF INFORMATION WITH A DRIVE SYSTEM FOR A SCANNING DEVICE

The invention relates to an apparatus for the recording or for the reproduction of information with a drive system for a scanning device which is formed by a toothed rack arrangement driven by means of a special worm-gear mechanism. The drive system is provided for an apparatus for the recording or an apparatus for the reproduction of information which uses a scanning device to read or store information or data in one or more tracks of a recording medium. The recording medium may be, for example, a compact disc, known as CD, a digital versatile disc, known as DVD, a CD-ROM or DVD-ROM or an erasable CD or DVD or else a magneto-optical or other recording medium.

Apparatuses for the recording or for the reproduction of information or data in one or more tracks of a recording medium are generally known. Data or information are read from the recording medium or recorded on the recording medium by means of a scanning device, which is also referred to as "pick-up" and is arranged on a carriage which can be moved at an inclination or perpendicularly with respect to the recording track of the recording medium. In order to be able to access different points on the recording medium with high accuracy and speed and with a short access time, a toothed rack arrangement is generally provided on the carriage carrying the scanning device, which toothed rack arrangement is driven by an electric motor via a gearwheel mechanism. In order to compensate for tooth play, the toothed rack arrangement comprises two toothed racks which are braced with respect to one another by means of a spring, and either a pinion or a worm wheel for driving the gearwheel mechanism -is provided on the shaft of the electric motor. The gearing is designed to be self-locking in order to prevent alterations to the position of the scanning device when the drive is switched off or the electric motor is switched off. In accordance with the requirements made of a drive system for scanning devices in respect of positioning accuracy, speed and self-locking, use is made of gearwheel mechanisms driven by a pinion and having high transmission by means of a plurality of gearwheels or worm-gear mechanisms which comprise a worm and a worm wheel which is designed as a helical toothed spur wheel and is arranged on a common axle with a gearwheel driving the toothed rack arrangement. The toothed rack arrangement and the gearwheel driving the toothed rack arrangement are provided with straight toothing, in order to avoid displacements of the scanning device in the direction of the recording medium, such as the focused direction in the case of an optical recording medium, during tracking or track jumping and in the event of a change in the drive direction. For this reason, the toothed rack arrangement cannot be driven directly with a worm. Known worm-gear drives for scanning devices therefore use, in principle, a worm wheel driven by a worm and a gearwheel for driving the toothed rack arrangement. The worm wheel is helically toothed, in contrast to the gearwheel, and the axes of worm and worm wheel are arranged perpendicularly to one another. Drives of this type satisfy the requirements in respect of a short access time, little outlay and high positioning accuracy only to an inadequate extent, since resiliently braced toothed rack arrangements enable reliable positioning only at low speed. A change in the drive direction increases the access time. Numerous gearwheels as well as special gearing toothed wheels, such as, for example, in the case of a worm-gear mechanism which is as free from play as possible, require a high outlay. However, it is an advantage of the worm-gear mechanism that self-locking is achieved with a comparatively smaller number of gearwheels.

The object of the invention is to provide a drive system for a scanning device which requires little outlay and satisfies the requirements in respect of high positioning accuracy, short access time and self-locking.

This object is achieved by means of the features of the invention specified in the independent claim. Advantageous developments of the invention are specified in dependent claims.

One aspect of the invention is to configure a drive system for a scanning device in such a way that a high positioning accuracy and speed in the course of accessing different points on the recording medium as well as self-locking of the drive system are ensured with little outlay.

These requirements are met by means of a drive system which can be formed with just a one-piece toothed rack and has the advantageous properties of a worm-gear mechanism even though no worm wheel or helically toothed gearwheel is provided.

The drive system for a scanning device in an apparatus for the recording or for the reproduction of information is constructed in such a way that the toothed rack arrangement and the worm are arranged in engagement with just a single gearwheel. The gearwheel is a straight-toothed intermediate gearwheel and the worm which drives the toothed rack arrangement via the gearwheel is arranged at an angle with respect to the gearwheel, which angle corresponds to the lead of the said worm. By virtue of the inclined position of the worm, a straight-toothed gearwheel is advantageously brought into engagement with the worm, with the result that advantageous properties of a worm-gear mechanism are preserved and a helically toothed gearwheel is obviated. The worm is preferably a multi-start worm arranged on a shaft having counterbearings in the axial direction, in order to ensure that the scanning device immediately follows a change in the direction of the drive.

To that end, a first counterbearing is preferably formed by a driving electric motor and a second counterbearing is formed by a limiting means which limits axial play of the shaft of the electric motor. The worm is arranged on the shaft of the electric motor. The shaft with the worm and the electric motor are preferably arranged parallel to the toothed rack arrangement and at an angle with respect to the gearwheel with respect to the toothed rack arrangement, which angle corresponds to the lead of the worm. As a result, a first engagement of the gearwheel with the toothed rack arrangement and a second engagement of the gearwheel with the worm are situated opposite one another. As a result, the gearwheel driving the toothed rack arrangement is additionally supported by the worm against the toothed rack arrangement, thereby preventing the gearwheel from being forced away from the toothed rack and avoiding a corresponding slip. Compared with a toothed rack arrangement driven by a spur wheel, the inventive drive system with the gearwheel provided as intermediate gearwheel has improved robustness and a smaller degree of play. The smaller degree of play also results, inter alia, from the reduced number of gearwheels of the drive system and it is possible to use a toothed rack arrangement formed by a one-piece toothed rack, whereby the play in the event of a change in the drive direction is further reduced and the access time to different points on the recording medium is shortened.

By virtue of the engagement of the worm in the gearwheel provided as intermediate gearwheel being arranged oppositely with respect to the toothed rack, the tooth play is reduced in such a way that it is possible to use just a one-piece toothed rack. Additional means for compensating for tooth play, such as a toothed rack arrangement comprising resiliently braced toothed racks, are not necessary. This may be ascribed, inter alia, to the fact that the toothed rack is not driven with a spur wheel but rather with an intermediate wheel which is supported, in addition to the axle on which it is fastened on the worm on the shaft of the electric motor. The shaft is mounted in the electric motor, on the one hand, and, on the other hand, in a limiting means which simultaneously limits the tooth play with respect to the toothed rack and any axial play of the worm. The use of just a single toothed rack has the advantage, in particular, that even in the event of a change in direction, a high positioning accuracy is achieved with a high speed since a delay based on resiliently braced toothed racks does not occur. The drive system is self-locking. Self-locking is to be understood to mean the case where the frictional resistance in the gearing suffices to make it impossible for the worm to be driven by the worm wheel, which is formed by the intermediate gearwheel in this case. The drive system requires little outlay on account of the reduced number of gearwheels, and enables a short access time to different points on the recording medium by virtue of a high positioning accuracy and speed.

Figure 2:
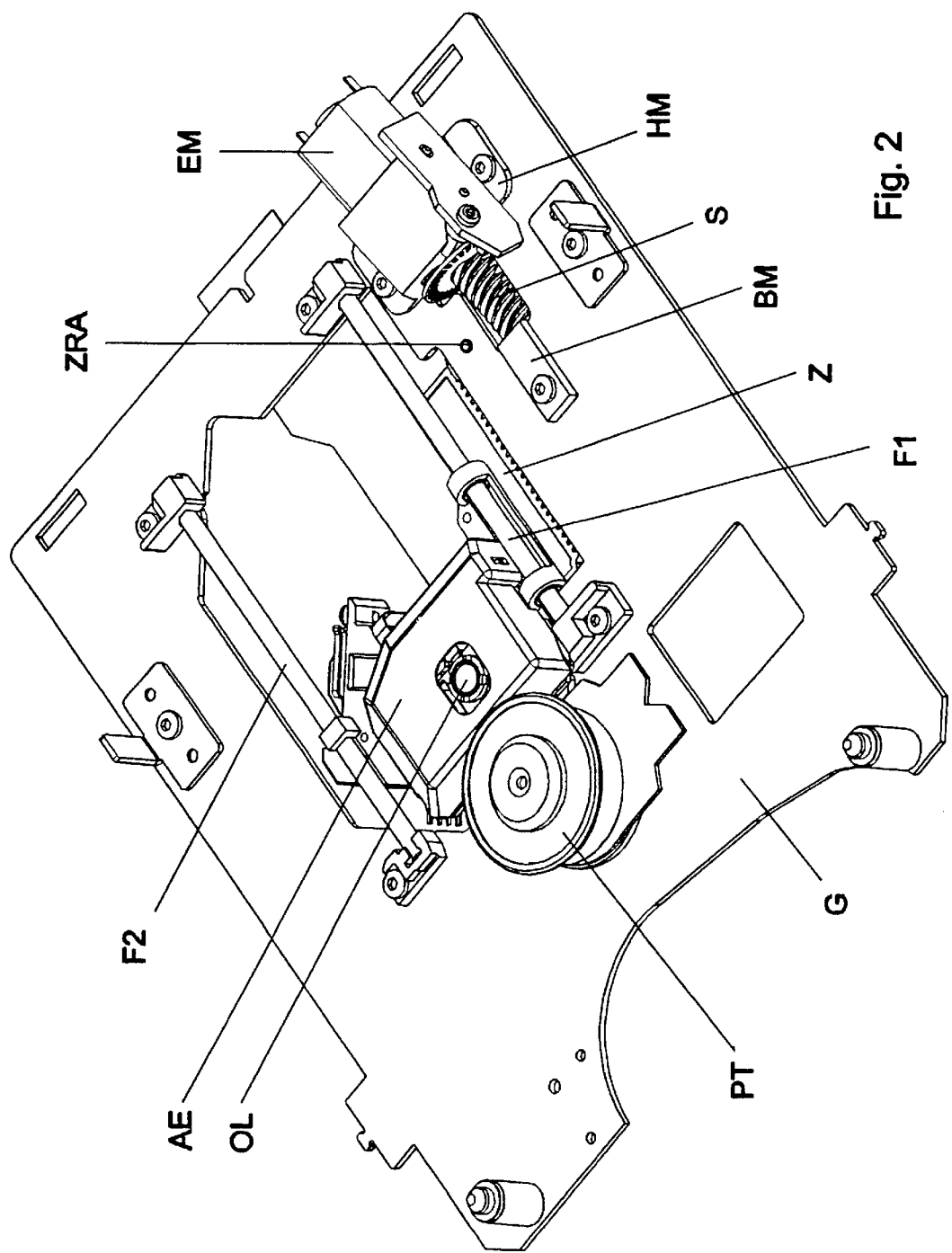

The invention is explained in more detail below using an exemplary embodiment with reference to drawings, in which:

FIG. 1 shows a schematic sketch of a drive system for a scanning device in an apparatus for the recording or for the reproduction of information, FIG. 2 shows a sketch of a perspective view of the drive system for a scanning device in an apparatus for the recording or for the reproduction of information, FIG. 3 shows a side view of a section through the drive system for a scanning device in an apparatus for the recording or for the reproduction of information, and FIG. 4 shows a plan view of the drive system for a scanning device in an apparatus for the recording or for the reproduction of information.

Reference symbols are used in a manner such that they correspond throughout the drawings. The schematic sketch, illustrated in FIG. 1, of a drive system for a scanning device in an apparatus for the recording or for the reproduction of information shows a toothed rack arrangement Z and a worm S, which are arranged in engagement with a gearwheel ZR. The gearwheel ZR is a straight-toothed intermediate gearwheel and the worm S, which is driven by an electric motor EM is arranged at an angle with respect to the gearwheel ZR, which angle corresponds to the lead of the said worm. The arrangement of the worm S in an angle with respect to the gearwheel ZR, which angle corresponds to the lead of the said worm, advantageously enables the use of a straight-toothed gearwheel ZR in interaction with the worm S, with the result that only one gearwheel ZR is necessary for driving the toothed rack arrangement Z. The toothed rack arrangement Z is part of a carriage which is guided on guide rods F1, F2 and carries a scanning device AE provided for scanning optical recording media. The scanning device has an objective lens OL, which is used to focus a light or laser beam in order to record or in order to reproduce information or data on an optical recording medium (not illustrated). The recording or the reproduction of information or data requires the scanning device to be tracked along the track or the tracks of the recording medium at high speed. In this case, high speeds can be achieved in a small region by displacement of the objective lens OL using a vernier drive (not illustrated). However, displacements of the objective lens OL from the optical axis of the scanning device AE reduce the scanning quality and are only possible in a small region, with the result that high requirements in respect of accuracy and speed are also made of the drive system of the scanning device AE, which is also referred to as the coarse drive. The speed at which it is possible to move exactly to a position on the recording medium determines the access time to information or data of the recording medium. In this context, the access time is also significant in the event of a change in the drive direction. Toothed rack arrangements formed from two toothed racks braced with respect to one another by means of a spring, in particular, have the disadvantage that the access time is considerably prolonged in the event of a change in the drive direction as a result of the resilient tooth play. The drive system illustrated in the figures has a toothed rack arrangement Z formed by a one-piece toothed rack. In principle, however, the drive system could also be constructed using a toothed rack arrangement comprising two toothed racks. A toothed rack arrangement Z formed by a one-piece toothed rack can be used by virtue of the structure of the drive system as illustrated in the figures. This structure consists in the worm S being arranged opposite the toothed rack arrangement Z. The gearwheel ZR driving the toothed rack arrangement Z is thereby clamped in between the worm S and the toothed rack arrangement Z. The gearwheel ZR is supported against the toothed rack arrangement Z by the worm S, which, in accordance with FIG. 2, is fastened with a holding means HM via the electric motor EM and with a limiting means BM on a baseplate G. Consequently, forces acting from the toothed rack arrangement Z on the gearwheel ZR cannot force the gearwheel ZR away from the toothed rack arrangement Z, the overall result being that a lesser degree of drive play occurs, which enables the use of a toothed rack arrangement Z consisting of a one-piece toothed rack. As a result, the access time is also reduced in the event of a change in the drive direction.

FIG. 2 also illustrates a disc turntable PT, which receives a recording medium (not illustrated) that is scanned by the scanning device AE. The scanning device AE is moved with the drive system along the guide rods F1, F2 in the radial direction towards the disc turntable PT, in order to be able to access the recording medium rotating above the scanning device AE. The worm S arranged on the shaft of the electric motor EM is situated in an opening in the baseplate G and is arranged at an inclination with respect to the plane of the baseplate G, with the result that it extends through the baseplate G. The electric motor EM is fastened by a holding means HM on the baseplate G and has an inclined position with respect to the baseplate G, which inclined position corresponds to the worm S or to its shaft. In order to minimize, or preclude, any axial play of the worm S, a limiting means BM is provided on that end of the shaft carrying the worm S which is opposite to the electric motor EM. The worm S is aligned with the limiting means BM and the holding means HM in the axial and radial directions. The gearwheel ZR and the toothed rack arrangement Z are arranged underneath the baseplate G, with the result that only the receptacle of the gearwheel axle ZRA of the gearwheel ZR can be discerned in FIG. 2. The inclined position, determined by the lead of the worm S, of the electric motor EM and of the worm with respect to the plane of the baseplate G, in order advantageously to enable engagement, with the worm, in a straight-toothed gearwheel ZR, is revealed particularly clearly in FIG. 3. The gearwheel ZR, which is not visible in this illustration, is situated behind the worm S. Both the engagement of the worm S in the gearwheel ZR and the engagement of the gearwheel ZR in the toothed rack arrangement Z are provided in a plane parallel to the baseplate G. FIG. 3 also reveals that the required structural height of the apparatus is advantageously reduced in comparison with apparatuses having the electric motor arranged underneath the baseplate G. The disc turntable motor is situated directly under the disc turntable PT and is likewise fastened on the baseplate G.

From the plan view of the drive system for a scanning device in an apparatus for the recording or for the reproduction of information as illustrated in FIG. 4, it becomes clear that a region of the worm S which runs parallel to the axis of the gearwheel ZR engages in the gearwheel ZR, with the result that a straight-toothed gearwheel ZR can be used, advantageously, as worm wheel.

The worm S is preferably a multi-start worm S, such as a three-start worm S, for example, in order to realize both a high drive speed of the scanning device AE for short access times and self-locking. The self-locking action is reinforced by the robustness of the drive system, which is manifested because the drive system has no spur wheels. Consequently, the drive system can also advantageously be used in apparatuses whose scanning device AE has a comparatively larger weight, such as, for example, in the case of a scanning device AE with a changeover capability for different recording media.

Compared with known drive systems, the access time with the drive system according to the invention was able to be reduced by approximately 50 per cent.

By virtue of the fact that only a straight-toothed intermediate wheel is required between worm S and toothed rack arrangement Z, the drive system can be produced with little outlay.

A high positioning accuracy is ensured by the gearing chain reduced by at least one gearwheel and by the fact that spur wheels are avoided.

The exemplary embodiment specifies one advantageous configuration of the invention. However, the invention is not restricted to this exemplary embodiment but rather also includes the modifications which are familiar to a person skilled in the art.

What is claimed is:

1. Apparatus for the recording or for the reproduction of information with a drive system for a scanning device, comprising:

a worm-gear mechanism;

a gearwheel arrangement;

a toothed rack arrangement driven by means of the worm-gear mechanism via the gearwheel arrangement, wherein the toothed rack arrangement and the worm-gear mechanism are arranged in engagement with the gearwheel arrangement by meshing with teeth of a single gearwheel disposed on the gearwheel arrangement.

2. Apparatus according to claim 1, wherein the gearwheel is a straight-toothed intermediate gearwheel.

3. Apparatus according to claim 1, wherein the worm is arranged at an angle with respect to the gearwheel, which angle corresponds to the lead of the said worm.

4. Apparatus according to claim 1, wherein the worm is a multi-start worm.

5. Apparatus according to claim 2, wherein the straight-toothed intermediate gearwheel is used as worm wheel.

6. Apparatus according to claim 4, wherein the worm is arranged on a shaft having counterbearings in the axial direction.

7. Apparatus according to claim 6, wherein a first counterbearing is formed by a driving electric motor and a second counterbearing is formed by a limiting means that limits axial play.

8. Apparatus according to claim 1, wherein the worm is arranged parallel to the toothed rack arrangement at an angle corresponding to the lead of the worm.

9. Apparatus according to claim 1, wherein a first engagement of the gearwheel with the toothed rack arrangement and a second engagement of the intermediate gearwheel with the worm are provided such that they are situated oppositely.

10. Apparatus according to claim 1, wherein in that the toothed rack arrangement is a one-piece toothed rack.

* * * * *